United States Patent [19]

Deutsch

[11] 4,286,491

[45] Sep. 1, 1981

[54] UNIFIED TONE GENERATION IN A POLYPHONIC TONE SYNTHESIZER

[75] Inventor: Ralph Deutsch, Sherman Oaks, Calif.

[73] Assignee: Kawai Musical Instruments Mfg. Co., Ltd., Hamamatsu, Japan

[21] Appl. No.: 113,420

[22] Filed: Jan. 18, 1980

[51] Int. Cl.³ .............................................. G01H 1/00

[52] U.S. Cl. ...................................... 84/1.01; 84/1.22; 84/1.24

[58] Field of Search ...................... 84/1.01, 1.19, 1.03, 84/1.22, 1.24

[56] References Cited

U.S. PATENT DOCUMENTS 4,085,644 4/1978 Deutsch et al. ........................ 84/1.03

4,122,742 10/1978 Deutsch ................................ 84/1.19

*Primary Examiner*—J. V. Truhe

*Assistant Examiner*—Forester W. Isen

*Attorney, Agent, or Firm*—Ralph Deutsch

[57] ABSTRACT

In a musical instrument having one or more tone generators in which a plurality of data words corresponding to amplitudes of a corresponding number of evenly spaced points defining the waveform of an audio signal composed of a number of unified tones are generated by the combination of three master data sets. The three master data sets are computed separately from stored sets of even and odd harmonic coefficient values. The master data set values are combined using their symmetric properties and are transferred sequentially to a digital-to-analog converter in repetitive cycles at a rate proportional to the unison pitch of the corresponding keyboard note to produce the tone color of a combination of unified tones.

18 Claims, 6 Drawing Figures

UNIFIED TONE GENERATION IN A POLYPHONIC TONE SYNTHESIZER

FIELD OF THE INVENTION

This invention relates to the production of musical waveshapes, and in particular it is concerned with an improvement for generating such waveshapes in a polyphonic tone synthesizer.

BACKGROUND OF THE INVENTION

In U.S. Pat. No. 4,085,644 there is described a Polyphonic Tone Synthesizer in which a master data set is computed and stored in a main register from which it is transferred to note registers of a plurality of tone generators. The master data set defines the amplitudes of equally spaced points along a half cycle of the audio waveform of the musical tones being generated. Each tone generator receives the binary words in the master data set and applies them to a digital-to-analog converter at a rate determined by the fundamental pitch of the respective tones being generated by the Polyphonic Tone Synthesizer.

One of the features of the Polyphonic Tone Synthesizer, as described in the above-identified patent, is that the transfer of successive words from the master data set in the main register to an individual note register in the respective tone generators is synchronized with the transfer of binary words from the note register to the digital-to-analog converter in the respective tone generators. This feature permits the master data set defining the waveform to be recomputed and loaded in the respective tone generators without interrupting the generation of the respective musical notes by the tone generators, thus permitting the waveform of a musical tone to be changed with time without interrupting the resulting musical tone.

There are several criteria for classifying types of electronic keyboard musical instruments. They can be typed as being monophonic or polyphonic depending upon whether or not they are implemented to play one or more than one note at a time in response to actuated keyboard switches. These instruments can be further classified by the manner in which tones at different fundamental pitches are generated. Pitches in organ-like musical instruments are commonly designated by footages following established pipe organ terminology. Thus an 8-foot pitch, also called the unison pitch, will be one for which the keyboard note $A_4$ will cause a tone to be generated having a fundamental frequency of 440 hz.

Two principal techniques are usually employed to generate tone pitches other than the unison pitch. The first technique is that which is known by the generic term "straight." A pipe organ constructed to use straight tone implementation will have a separate and independent rank (set) of pipes corresponding to each stop (tone control). Thus an 8-foot stop will be associated with its own dedicated set of pipes. A 4-foot stop will also have its own dedicated set of pipes. If both an 8-foot and 4-foot stop are drawn (actuated), then each actuatated keyboard switch will cause two individual pipes to be blown.

The advent of the theatre organ caused another tone combination system to flourish and reach rather advanced and complex forms. The principal tonal contribution of the theatre organ development was the use of what is known by the generic name of "unified" stops. In a unified organ a 4-foot stop is obtained from a parent 8-foot rank by mechanically, or electrically, causing a note to sound one-octave higher than that associated with the actuated keyboard switch. Thus if an 8-foot and 4-foot unified stop combination is selected each keyed note will cause the unison pipe and one in the next higher octave to sound simultaneously. The same general keyboard switching scheme is readily extended to other footages such as the commonly used set of pitches: 16′, 4′, $2\frac{2}{3}$′, 2′, 1 3/5′, 1′. In this fashion unification has been used to obtain a fairly large number of stops from a single rank of pipes. Thus one advantage of unification lies in the economics of extending the use of a single rank of pipes to a number of stops.

There are some tonal deficiencies that are inherent with most unified organ designs. First there is the problem of missing notes that frequently perplexes beginning players on unified instruments. If an 8-foot and 4-foot combination is drawn (two actuated stops) and $C_4$ is keyed then the instrument will simultaneously play $C_4$ and $C_5$. If $C_4$ and $C_5$ are keyed with the same stop combination, the instrument will sound the notes $C_4$, $C_5$, $C_6$. Only three, rather than four, notes will sound because $C_5$ corresponds to the 4-foot pitch for the keyed note $C_4$ and to the 8-foot pitch for the keyed note $C_5$. If $C_5$ is played after first playing $C_4$, the neophyte player is confused because he does not hear the added unison tone for $C_5$ which is already sounding because of the 4-foot stop. All he hears is the addition of $C_6$ which is not the fundamental tone for the actuated $C_5$ note switch. A second tonal characteristic of unified instruments is that unified systems cause the lower footages (higher pitches) to sound much louder than is desireable because there is no separate loudness compensation for the lower footages which in reality are simply "borrowed" or unified from a single unison rank.

A straight organ design will usually employ different harmonic structure for the higher pitches in common tone families. Moreover, the lower footage ranks are generally made increasingly softer with decreased footage so that their combination blends musically with the unison pitch tones.

A system for unifying an electronic organ is described in U.S. Pat. No. 3,697,661 entitled "Multiplexed Pitch Generator For Use In A Keyboard Musical Instrument." This system operates by using a conventional time division multiplex of the keyboard switches. Unification is obtained by inserting keyed positions into later slots in the multiplex time scan after delays depending upon the desired unification pitches.

Digital tone generators such as those described in U.S. Pat. No. 3,515,792 entitled "Digital Organ"; U.S. Pat. No. 3,809,789 entitled "Computer Organ"; and U.S. Pat. No. 4,085,644 entitled "Polyphonic Tone Synthesizer" are generally implemented as straight organs. This choice is made partly for tonal reasons and partly because in such systems it has been found to be far more economical to implement a straight organ design for different stop pitches than to add the extra circuitry that would be required to obtain a unified tonal stop design. In the referenced digital tone generation systems higher pitched (lower footage) stops are obtained by a scheme of harmonic suppression. For example, a 4-foot stop is implemented by using only the even harmonics from the total set of harmonics and suppressing all the odd harmonics. A $2\frac{2}{3}$-foot stop is implemented by using only the harmonic sequence 3,6,9,12,15, . . . and suppressing all other harmonics. This technique of harmonic suppression produces a good approximation to "proper" organ tonal design in that an independent loudness can be designed for each stop regardless of footage and each stop has its own set of harmonic components which can be independent of any other stop or footage. A negative tonal attribute to the method of using harmonic suppression for lower footage stops is that all the combined stops are phase locked to the unison pitch.

Unified stops are desirable if one wishes to imitate the tonal characteristics of the very popular American theatre organ which is based upon the liberal use of unification. The referenced digital tone generators can be unified in a straightforward manner by using a keyboard system such as that described in the above referenced U.S. Pat. No. 3,697,661 and by adding additional tone generators. The basic digital organs usually have 12 tone generators. An additional set of 12 tone generators are required for each unified pitch. These additional sets of tone generators quickly makes unification prohibitive in cost.

It is an objective of the present invention to obtain unified tonal design in the Polyphonic Tone Synthesizer without increasing the number of tone generators and without increasing the speed of the system timing clocks.

SUMMARY OF THE INVENTION

In a Polyphonic Tone Synthesizer of the type described in U.S. Pat. No. 4,085,644 a computation cycle and a data transfer cycle are repetitively and independently implemented to provide data which are converted to musical waveshapes. During the computation cycle a master data set is created by implementing a discrete Fourier algorithm using a stored set of harmonic coefficients which characterize a preselected musical tone. The computations are carried out at a fast rate which may be nonsynchronous with any musical frequency. Preferably the harmonic coefficients and the orthogonal functions required by the Fourier algorithm are stored in digital form and the computations are carried out digitally. At the end of a computation cycle the master data set is stored in a main register.

Following a computation cycle, a transfer cycle is initiated during which the master data is transferred to preselected members of a multiplicity of note registers. Tone generation continues uninterrupted during the computation and transfer cycles.

The present invention is directed to an improved arrangement by which the tonal effects characteristic of a unified theatre organ are obtained. The computation cycle is divided into three segments and the resultant data is stored in three data registers. The same set of harmonic coefficients are used for the calculations in each segment of the computation cycle. The 4-foot master data set is calculated during the first segment of the computation cycle in the manner described in the above referenced patent for a master data set corresponding to an 8-foot pitch. During the second segment of the computation cycles the data points for a half cycle of the 8-foot tone are computed in a particular fashion and added point-wise to the previously calculated 4-foot master data set values. During the third segment of the computation cycle a 16-foot master data set is calculated for one-quarter of the number of data points comprising a complete waveshape period.

After the completion of the three segments of the computation cycle, the resulting master data sets are combined in a particular fashion and transferred to three note registers. Using logic based upon waveshape symmetry the data accessed from the note registers are combined producing the desired result of a unified tonal structure. The combined output digital data are converted to analog signals which are provided to a conventional sound production system.

BRIEF DESCRIPTION OF THE DRAWINGS

For a better understanding of the invention reference should be made to the accompanying drawings.

DETAILED DESCRIPTION OF THE INVENTION

The present invention is directed to an improvement in the tone generation system for a polyphonic tone synthesizer of the type described in detail in U.S. Pat. No. 4,085,644 entitled "Polyphonic Tone Synthesizer" and which is hereby incorporated by reference. In the following description, all elements of the system which have been described in the referenced patent are identified by two digit numbers which correspond to the same numbered elements used in the patent. All system element blocks which are identified by three digit numbers correspond to elements added to the Polyphonic Tone Synthesizer to implement the improvements of the present invention.

Figure 1:
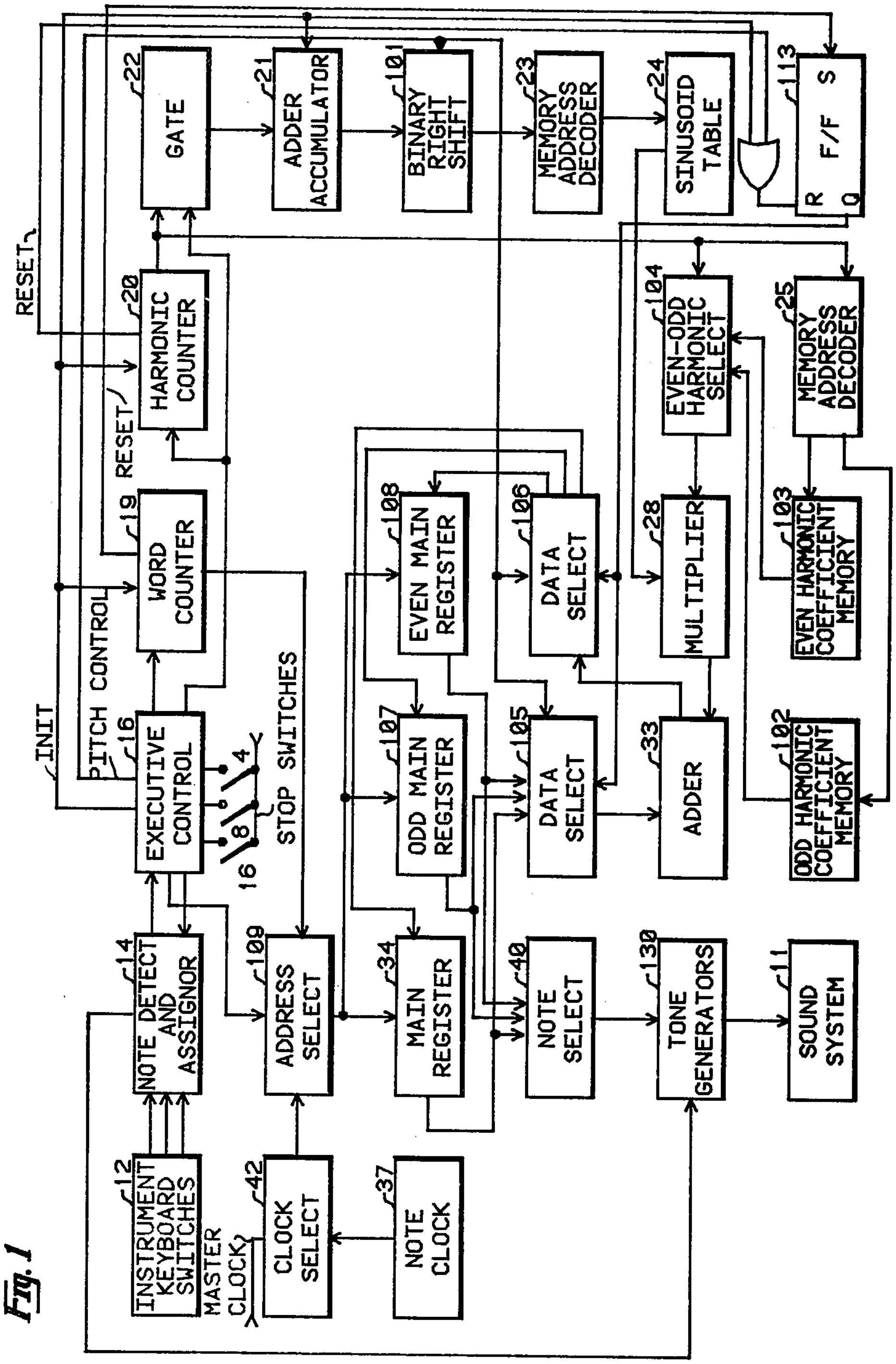
FIG. 1 is a schematic block diagram of an embodiment of the present invention.

FIG. 1 shows an embodiment of the present invention for simultaneously generating unified musical tones at 16-foot, 8-foot, and 4-foot pitches. This set of three pitches are those most frequently used in theatre organs. These do not represent a limitation to the present invention and extensions to other pitches are readily made.

Sound system 11 indicates generally an audio sound system capable of receiving and mixing up to twelve separate audio signals. Each input signal to the sound system is generated by its own tone generator contained in the set of twelve tone generators shown generally by the block labelled tone generators 130. The tone generators are assigned in response to actuation of keyswitches on the instrument keyboard switches 12. Up to twelve keys may be operated simultaneously to generate as many as twelve simultaneous tones. It will be understood that a polyphonic system having twelve tones is only given by way of example and does not represent a system limitation.

The set of tone generators all receive common data generated by the computation and control logic.

Whenever a key on the musical instrument's keyboard is depressed and actuates a keyboard switch, note detect and assignor 14 stores information corresponding to the particular actuated keyboard switches and assigns that key to one of the twelve tone generators in the system which is not currently assigned. The note, or keyswitch, information and the fact that it has been assigned to a particular tone generator is stored in a memory (not shown) in the note detect and assignor circuit 14. The operation of a suitable note detect and assignor subsystem is described in U.S. Pat. No. 4,022,098 entitled "Keyboard Switch Detect and Assignor" which is hereby incorporated by reference.

A computation cycle consisting of three segments is initiated by the executive control 16. The computation cycle can be initiated when one or more keys have been actuated on the keyboard. As described below, the start of a computation cycle is inhibited until the completion of a transfer cycle so that the tone generation can continue uninterrupted during the sequences of computation cycle and transfer cycle.

Figure 2:
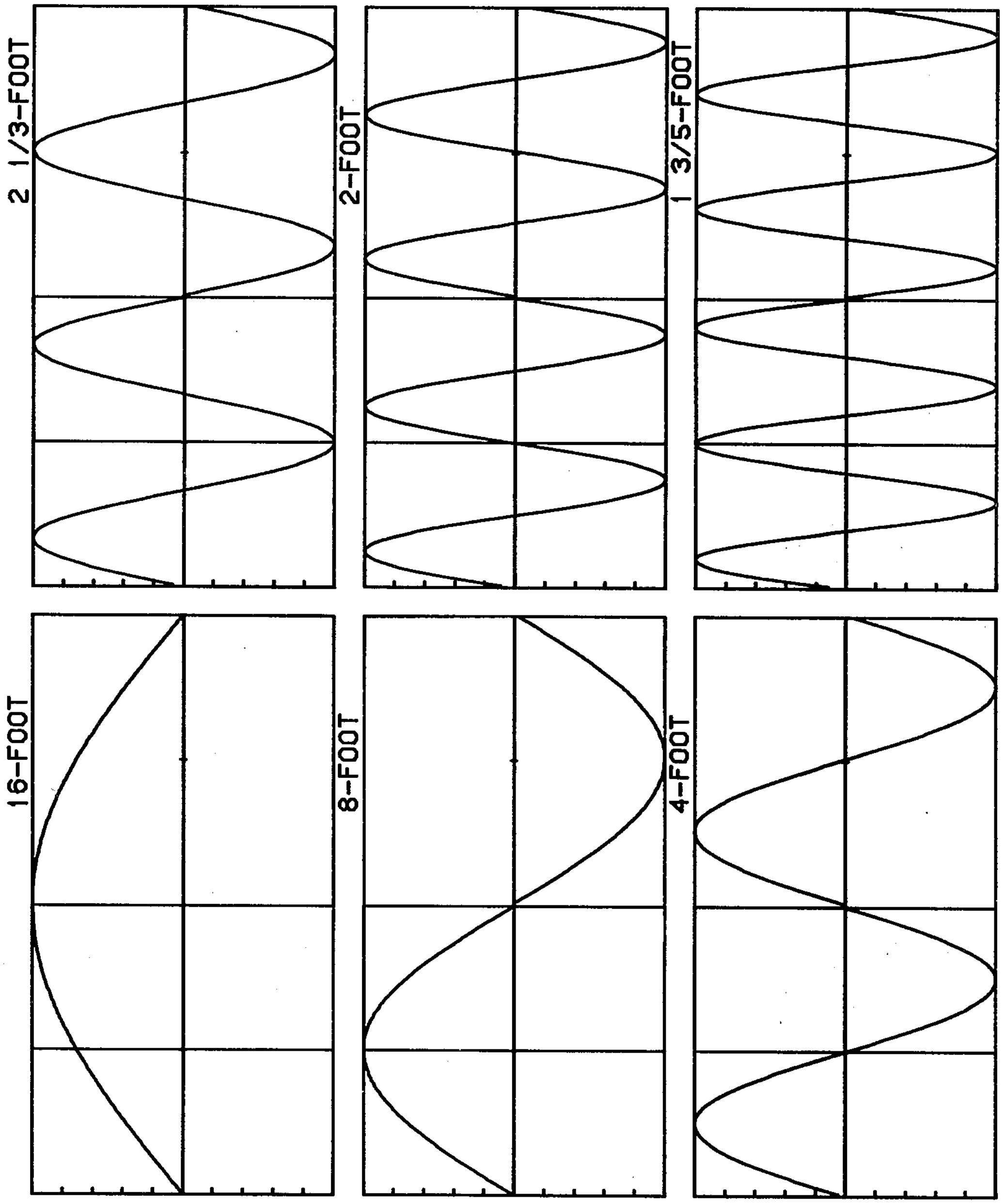
FIG. 2 is a graphic illustration of the waveshape symmetries for a set of tone pitches.

The detailed calculations made during the three segments of the computation cycle are motivated by the waveshape symmetries shown in FIG. 2. FIG. 2 illustrates the fundamental waveshape for six of the tone footages most frequently used in musical instruments using only sine functions in the Fourier transform. It is observed that the fundamental frequency waveform for the set of six footages are all odd-symmentric about their half-wave point. Only a half cycle of the 16-foot waveshape is shown in FIG. 2. The 8-foot waveshape has an even-symmetry about the one-quarter wave point while the 4-foot waveshape has an odd-symmetry about the one-quarter wave point.

One notes that all the odd harmonics of the fundamental 8-foot tone will be even symmetric about the one-quarter wave point and will be odd symmetric about the one-half wave point. All the even harmonics of the 8-foot tone will be odd symmetric about the one-quarter wave point and odd symmetric about the half-wave point.

If cosine functions are used in the Fourier transform then the odd harmonics of the 8-foot fundamental will be odd symmetric about the one-quarter wave point and even symmetric about the one-half wave point. The even harmonics will be even symmetric about the one-quarter wave point and even symmetric about the half-wave point.

Similar symmetric relations occur if odd symmetric orthogonal functions are used in place of the trigonometric sine functions or if even symmetric orthogonal functions are used in place of the trigonometric cosine functions in the Fourier algorithm.

The quarter-wave and half-wave symmetries of the 8-foot and 4-foot waveshapes are utilized in generating a combined footage waveshape master data set during the first and second segment of the computation cycle in a manner similar to that described in the copending application Ser. No. 65,312 filed Aug. 9, 1979 entitled "Simultaneous Voice Pitches In A Polyphonic Tone Synthesizer." The referenced application and the present application have a common assignee. In the present invention the 4-foot computation cycle occurs during the first segment of the computation cycle and corresponds to the 8-foot computation cycle of the referenced copending application. Similarly the present 8-foot computation cycle occurs during the second segment of the computation cycle and corresponds to the 16-foot computation cycle of the referenced copending application.

At the start of the first segment of the computation cycle, the executive control 16 sets the PITCH CONTROL signal to the 4-foot state. This state can be designated as a "0" logic state. The incrementing of the word counter 19 and harmonic counter 20 are described in the referenced U.S. Pat. No. 4,085,644.

The word counter 19 is implemented to count modulo 32. This corresponds to a waveshape for a 4-foot pitch having a maximum of 32 harmonics. The number 32 is called the "set" number and denotes the number of data words in the a master data set. The state of this counter is used to address data into and out of the set of registers: main register 34, odd main register 107, and even main register 108. The harmonic counter 20 is incremented each time that the word counter 19 returns to its initial state. The harmonic counter 20 is implemented to count modulo a specified value for the maximum harmonic number used in computing a master data set. This maximum value is no greater than the set number used for the word counter 19.

Gate 22, in response to the executive control 16, transfers the current state of the harmonic counter 20 to the adder accumulator 21 which adds the current data to the value presently in its accumulator.

At the start of each segment of the computation cycle, executive control 16 initializes the states of the word counter 19, harmonic counter 20, and the adder-accumulator 21.

In response to the "0" state of the PITCH CONTROL signal during the first segment of the computation cycle, binary right shift 101 transfers data unaltered from the adder-accumulator 21 to the memory address decoder 23.

The contents of adder-accululator 21 are called argument values and are used to address stored data values from the sinusoid table 24 after being converted to the addressing data format by the memory address decoder 23.

Since a unified set of tones are to be generated, all the master data set values computed during the three segments of the computation cycle are generated by using a single set of harmonic coefficients which are stored in the odd harmonic coefficient memory 102 and the even harmonic coefficient memory 103.

The flip-flop 113 is set at the start of the first segment of the computation cycle at the same time that the word counter 19 is initialized to its initial count state.

For the first half of the first segment of the computation cycle, the odd harmonic coefficients addressed out of the odd-harmonic coefficient memory 102 by the memory address decoder 25 in response to the state of the harmonic counter 20, are selected for transfer by the even-odd harmonic select 104 in response to the Q="1" state of the flip-flop 113.

After the full set of odd harmonic values have been used in the first half of the first segment of the computation cycle, the harmonic counter 20 returns to its initial state because of its modulo counting action and at the same time generates a RESET signal. The generation of the RESET signal by the harmonic counter 20 causes flip-flop 113 to be reset so that its output state is Q="0". In response to the state Q="0", the even-odd harmonic select 104 selects and transfers the even harmonic coefficients read out from the even harmonic coefficient memory 103.

The harmonic coefficients selected by the even-odd harmonic select 104 are multiplied in multiplier 28 by the sinusoid value addressed out from the sinusoid table 24. These product values for the Fourier algorithm are called the constituent harmonic components.

In response to the "0" state of the PITCH CONTROL signal during the first segment of the computation cycle, data select 105 will cause data read out from the main register 34 in response to the state of the word counter 19 to be transferred and furnished as one of the inputs to the adder 33. The second input to the adder 33 is the product data furnished by the multiplier 28. The sum data from adder 33 is transferred via data select 106 to be written into the main register 34 in response to the "0" state of the PITCH CONTROL signal.

The PITCH CONTROL signal is a three state binary signal (two-bit word) in which each state designates one of the three segments of the computation cycle.

At the conclusion of the first segment of the computation cycle, the second segment is initiated during which the master data set values corresponding to the 8-foot pitch are created. Flip-flop 113 is set at the start of the second segment in response to the RESET signal generated by the word counter 19 when it is reset to its initial state. In response to the second state ot the PITCH CONTROL signal, binary right shift 101 will shift all its input data by one right binary bit shift. The net result is that the data from the adder-accumulator 21 is reduced by one-half in magnitude when it is transferred to the memory address decoder. This provides a scaled argument value for addressing values from the sinusoid table 24.

The remainder of the system operation during the second segment of the computation cycle proceeds in the manner analogous to the operation during the first segment of the computation cycle. The 8-foot contributions to the master data set are added point-wise to the prior computed submaster 4-foot master data obtained during the first segment of the computation cycle. The point-wise addition is effected by the combined action of data select 105 and data select 106 which select data from and transfer data to the main register 34 in response to the "1" state of the PITCH CONTROL signal.

During the third segment of the computation cycle 32 points, corresponding to one-quarter cycle of a 16-foot pitch waveshape, are computed in two component master data sets. The PITCH CONTROL signal is placed in state "2" by executive control 16 for the duration of the third segment of the computation cycle which is initiated upon the completion of the second segment.

In response to the state "2" of the PITCH CONTROL signal, binary right shift 101 will perform a right shift of two binary bit positions when transferring data from the adder-accumulator 21 to the memory address decoder 23 to provide the scaled argument values for addressing data from the sinusoid table 24.

The data selects 105 and 106 will transfer data into and out of the even main register 108 when odd harmonics are selected by the even-odd harmonic select 104 and they will transfer date into and out of the odd main register 107 when even harmonics are selected by the even-odd harmonic select 104.

Figure 3:
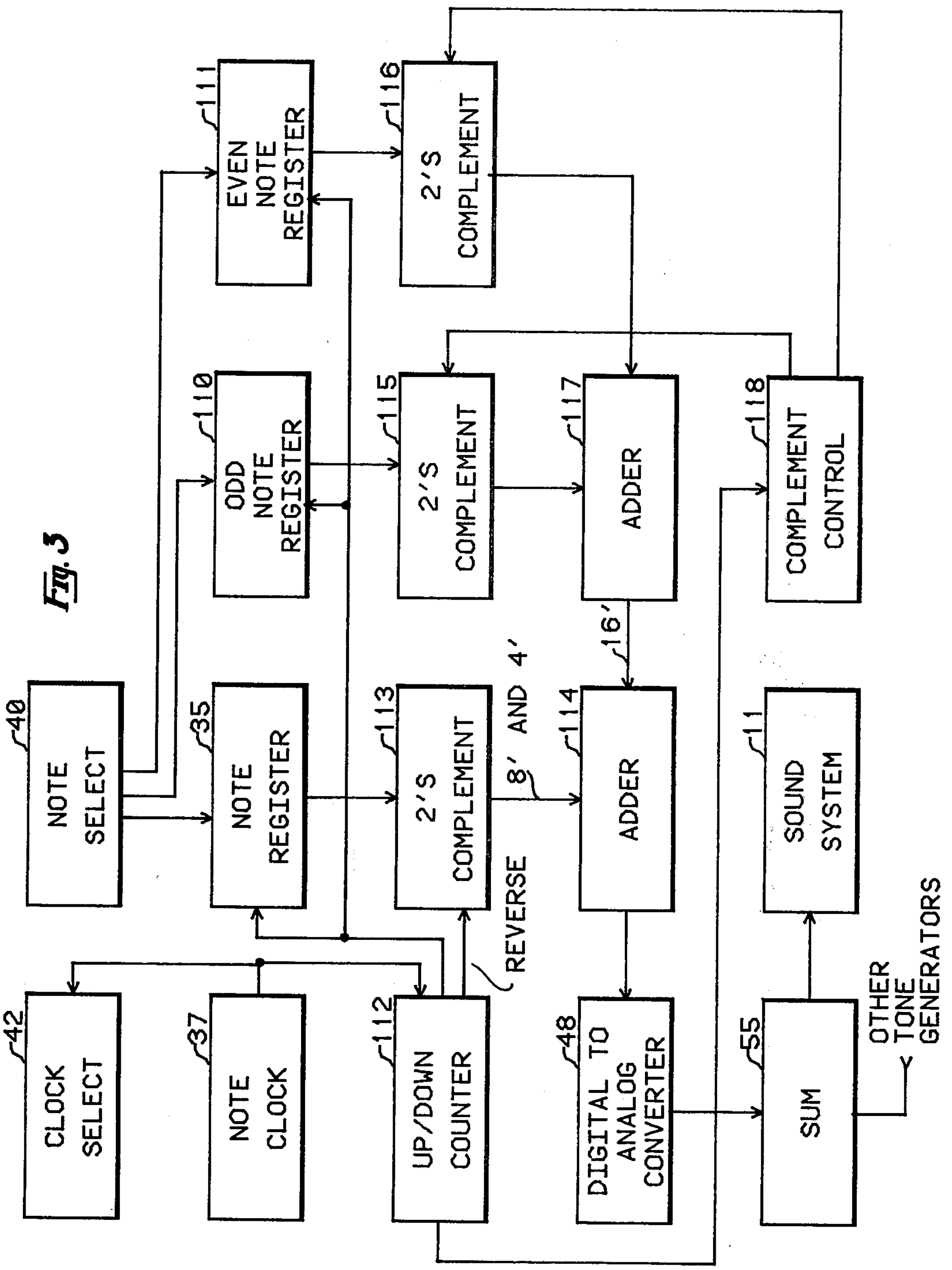
FIG. 3 is a schematic block diagram of a tone generator.

FIG. 3 shows the logic details for using the three master data sets to simultaneously generate the unified tone pitches of 16-foot, 8-foot, and 4-foot. In FIG. 3 the following system blocks constitute one of the set of tone generators indicated by the block labelled tone generators 130 in FIG. 1: note clock 37, note register 35, odd note register 110, even note register 111, up/down counter 112, 2's complement 115, 2's complement 116, adder 114, adder 117, complement control 118, and digital-to-analog converter 48.

Clock select 42 transfers timing signals from the system master clock to the address select 109 during the computation cycle. In response to the master clock timing and a control signal from the executive control 16, address select 109 transfers the state of the word counter 19 to the main register 34, odd main register 107 and even main register 108 to control the address of data read out of and written into these registers during the computation cycle.

At the conclusion of the computation cycle a transfer cycle is initiated to transfer the data in the three master data set registers to three note registers via the note select 40. Note select 40 determines which of the set of note generators is selected for the data transfer. For a data transfer, clock select 42 selects timing signals from note clock 37 to address data out of the three registers containing the master data set values. In this fashion, tone generation continues without interruption during the computation and data transfer cycles. The manner in which this data transfer is accomplished without interferring with the generation of the musical tones is described in the referenced U.S. Pat. No. 4,085,644.

At the conclusion of a transfer cycle the data residing in main register 34 is transferred to note register 35, the data in the odd main register 107 is transferred to the odd note register 110, and the data in the even main register 108 is transferred to the even note register 111.

The combined master data set stored in the note register 35 is addressed out at a rate determined by its assigned note clock 37. There are a variety of methods for implementing the note clock 37 which may be a voltage controlled oscillator. One such implementation is described in detail in U.S. Pat. No. 4,067,254 entitled "Frequency Number Controlled Clocks" which is hereby incorporated by reference.

Note clock 37 provides a train of clock pulses which is used to increment the up/down counter 112. The up/down counter 112 counts from an initial state 0 to a state 31, the state 31 is then repeated and the counter then decrements to state 0, state 1 is repeated and the counter cycle is repeated. The state of the up/down counter 122 is used to address data from the note registers while the count direction is used to control the logic which constructs the output waveshape data points employing the symmetric properties illustrated in FIG. 2.

When the up/down counter 112 is in its "up" counting mode the REVERSE signal will have the logic state "0" and when the counter is in its "down" counting mode this signal will have the logic state "1". The REVERSE signal is created by the up/down counter circuitry. The data stored in the note register 35 is addressed out at a rate determined by the note clock 37. This rate is selected so that the 32 data points in the note register 35 are read out at a speed such that 32 points corresponds to the musical period of the fundamental of a 4-foot pitch.

When the REVERSE signal is in the logic state "0", data read out of the note register 35 is transferred unaltered by the 2's complement 113 to the adder 114. When the REVERSE signal is in the logic state "1", data read out of the notote register is converted to its corresponding 2's complement form by the 2's complement 113 before being transferred to the adder 114. The result of the above described operations is that the data input to adder 114 from the 2's complement 113 corresponds to the combined unified 8-foot and 4-foot tones.

Using the same note clock 37 timing signals, data read out of the odd note register 110 and the even note register 111 in response to the state of the up/down counter are combined to produce the desired unified 16-foot tone waveshape data. The complement control 118 generates control signals which determine the operation of 2's complement 115 and 2's complement 116.

Figure 4:
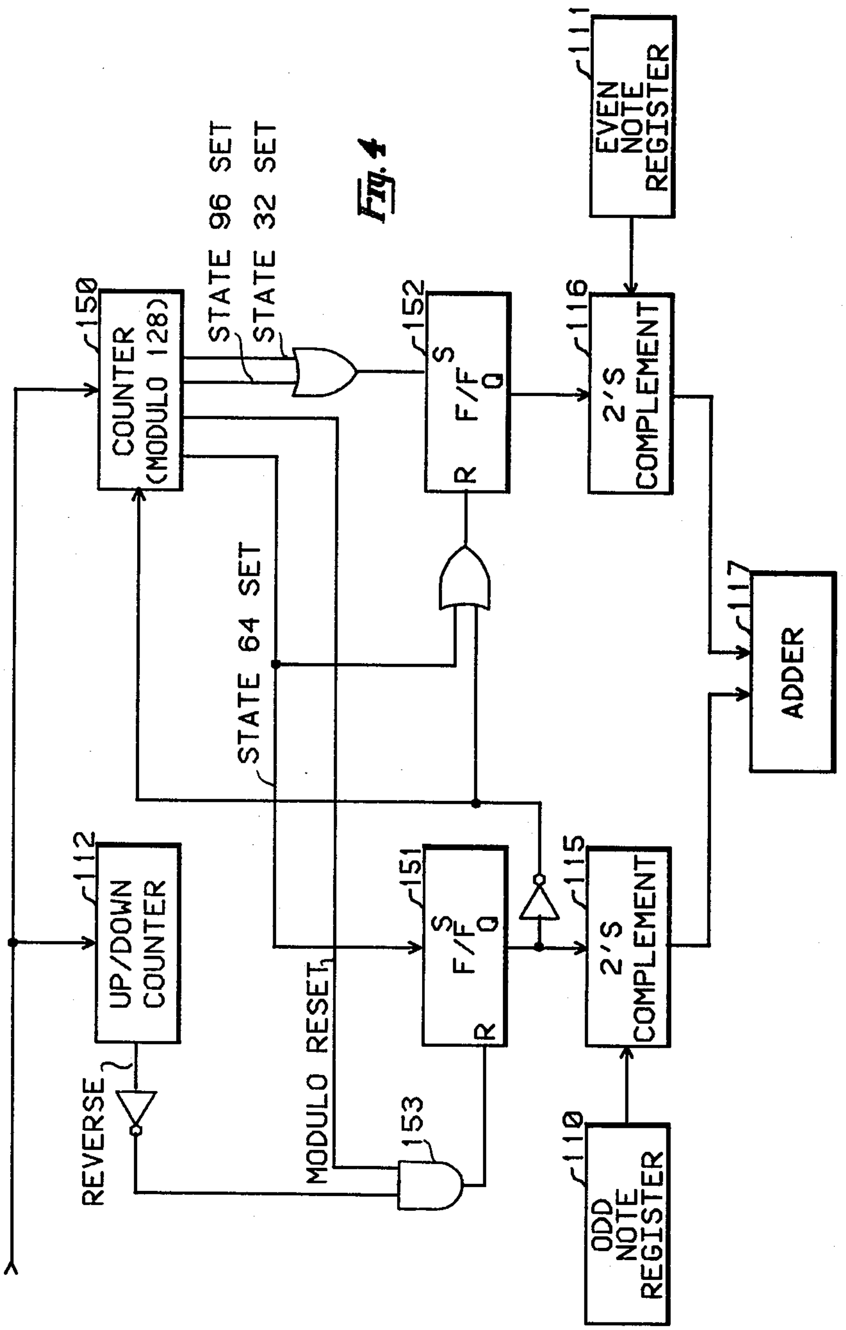
FIG. 4 is a schematic block diagram of the complement control.

FIG. 4 illustrates the detailed operation of the complement control 118 which comprises the logic blocks: counter 150, flip-flop 151, flip-flop 152, and AND gate 153. In response to the "0" state of the REVERSE signal from the up/down counter 112, both of the flip-flops are reset so that their output states are Q="0". The Q="0" state signal causes 2's complement 115 to transfer unaltered the data read out of the odd note register 110 to the adder 117.

When counter 150 reaches its count 64 state, a STATE 64 SET signal is generated which is used to set flip-flop 151 so that its output state is Q="1". The Q="1" state signal causes 2's complement 115 to perform a 2's complement binary operation on the data read out of the odd note register 110 before it is transferred to the adder 117.

Counter 150 generates a MODULO RESET signal when the counter returns to its initial state because of its modulo 128 counting implementation. In response to the MODULO RESET signal and the REVERSE signal input signal to the AND gate 153, flip-flop 151 is again reset to start another read cycle for the 16-foot tone data.

The result of the preceding system logic is that for the first 32 note clock pulses in a 16-foot data read out cycle, data is read out in the "up" direction from the odd note register 110 and is transferred unaltered to the adder 117. For counts 32 to 63 (assume first count state is 0), data is read out in the reverse, or "down" direction from the odd note register and is transferred unaltered to the adder 117. Data is read out in the "up" direction for counts 64 to 95 and a 2's complement is performed before the transfer to adder 117. Data is read out in the reverse direction for counts 96 to 127 and a 2's complement is performed before the transfer to the adder 117. This set of operations properly reconstructs the 16-foot tone wave structure for the odd harmonic components from a data set corresponding to one-quarter of a waveshape period.

During the count states 0 to 31, flip-flop 152 has its output state of Q="0". Thus for the first 32 counts of the 16-foot data read cycle, data is addressed out of the even note register 111 in the forward order and transferred unaltered to the adder 117 via the 2's complement 116. When counter 150 is incremented to count state 32, a STATE 32 SET signal is generated which is used to set the flip-flop 152 causing it to have the output state Q="1". Thus for counts 32 to 63 in the 16-foot data read cycle, data addressed out of the even note register 111 in reverse order has a 2's complement binary operation performed by the 2's complement 116 before the data is transferred to the adder 117. At the count state 64, flip-flop 152 is reset by the STATE 64 SET signal so that the output state becomes Q="0". Thus data is addressed out of the even note register 111 in the forward order for counts 64 to 96 and transferred unaltered to the adder 117. At the count state 96, a STATE 96 SET signal is generated which sets the flip-flop 152 so that the output state is Q="1" for counts 96 to 127. Thus data is addressed out of the even note register 111 in the reverse direction for counts 96 to 127 and a 2's complement binary operation is performed by the 2's complement of 116 before the data is transferred to the adder 117. The net result is that the even harmonic components of the 16-foot tone wave structure are reconstructed from the stored data set corresponding to one-quarter of a wave shape period.

The preceding 16-foot data read out cycle is continuously repeated. The 16-foot wave shape data is added with the 8-foot and 4-foot wave shape data in adder 114. The combined unified digital data is converted to an analog signal by means of the digital to analog converter 48. Sum 55 combines the analog signals created by other members in the set of tone generators and the combined signal is used by the sound system 11 to produce audible musical sounds.

Figure 5:
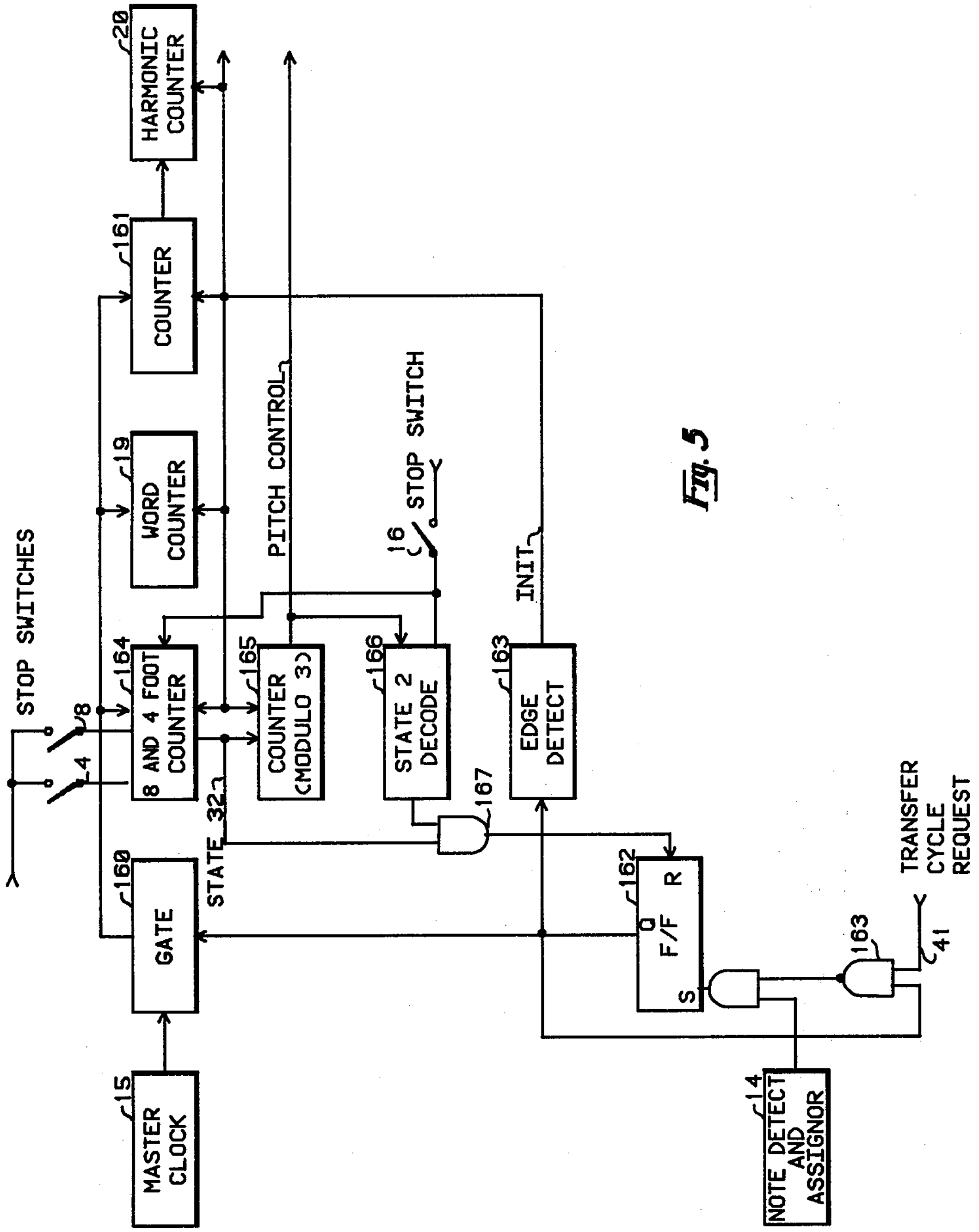
FIG. 5 is a schematic block diagram of the executive control.

FIG. 5 shows the details of the executive control 16 used in the system of FIG. 1. The system logic blocks in FIG. 5 having numbers of 160 and higher are elements comprising the executive control 16. A computation cycle is initiated when flip-flop 162 is set so that its output state is Q="1". Flip-flop 162 can be set if there is currently no request for a transfer cycle. NOR gate 163 prevents the initiation of a computation cycle if a transfer cycle has been initiated as indicated by a signal on line 41. Note detect and assignor 14 will generate a request for the start of a transfer cycle if this subsystem has detected that a keyswitch has been actuated on the musical instrument's keyboard. An alternative system logic is to automatically initiate a computation cycle at the completion of each transfer cycle to an individual tone generator or to the entire set of tone generators.

When flip-flop 162 is set at the start of a computation cycle, its output state Q="1" is converted into a signal pulse INIT by means of the edge detect 163. The INIT is used to reset counters 164, 161, 19, 20 and for the other system elements shown in FIG. 1 and whose operation has been previously described.

8 and 4 foot counter 164 is implemented to count modulo 32 if either an 8-foot, 4-foot, or 16-foot stop switch has been closed (actuated state). At the start of a complete computation cycle, the counter 165 is reset to its initial "0" state in response to the INIT signal. This counter is implemented to count modulo 3 and the PITCH CONTROL signal corresponds to the state of this counter.

If a 4-foot stop is actuated, the 8 and 4 foot counter 164 is initialized to state 0 in response to the INIT signal. When this counter reaches state 32, a STATE 32 signal is generated which increments the counter 165 to a count state "1". When counter 164 reaches state 32 for the second time during the computation cycle, a STATE 32 signal is again generated which increments counter 165 to a count state "2".

An alternative logic can readily be employed to save computation time by eliminating the first or second segments of the computation cycle depending upon the combined states of the 4-foot and 8-foot stops.

For example, if both stops are actuated then the first and second segments of the computation cycle are implemented. If the 4-foot stop is not actuated, then the INIT signal can be used to reset counter 165 to a state "1". Similarly if the 4-foot stop is actuated but the 8-foot stop is not actuated then the simple control logic can be implemented to increment counter 165 directly to state "2" from state "0" and thereby eliminate the second segment of the computation cycle which is allocated to the computation cycle of the 8-foot components of the master data set.

The state 2 decode 166 decodes the PITCH CONTROL signal and supplies a "1" logic state signal to AND gate 167 when the PITCH CONTROL is in state "2" signifying the third segment of the computation cycle. When the second input to the AND gate 167 is a logic state "1" because of a STATE 32 signal then the flip-flop 162 is reset and the computation cycle is terminated.

An alternative system logic can be used to eliminate the third segment of the computation cycle if the 16-foot stop switch is not actuated. For such an alternative, the output of state 2 decode 166 is a logic state "1" if the 16-foot stop switch is not actuated and the PITCH CONTROL is in state "2". Other arrangements can be readily implemented if other segments of the computation cycle are to be eliminated if corresponding stop switches are not actuated.

The embodiment of the present invention shown in FIG. 1 and previously described will simultaneously generate the unified pitches of 16, 8, and 4 feet from timing provided to a tone generator by a single note clock timing source. In some larger musical instruments of the generic type called organs, it is sometimes desirable to create unified tones at the mutation pitches. The mutation pitches include such pitches as those corresponding to 2⅔-foot, 2-foot, and 1 3/5 - foot. The mutation tones could be obtained in the same manner as that already described for the eight or four foot pitches by using the previously referred technique of harmonic suppression.

Figure 6:
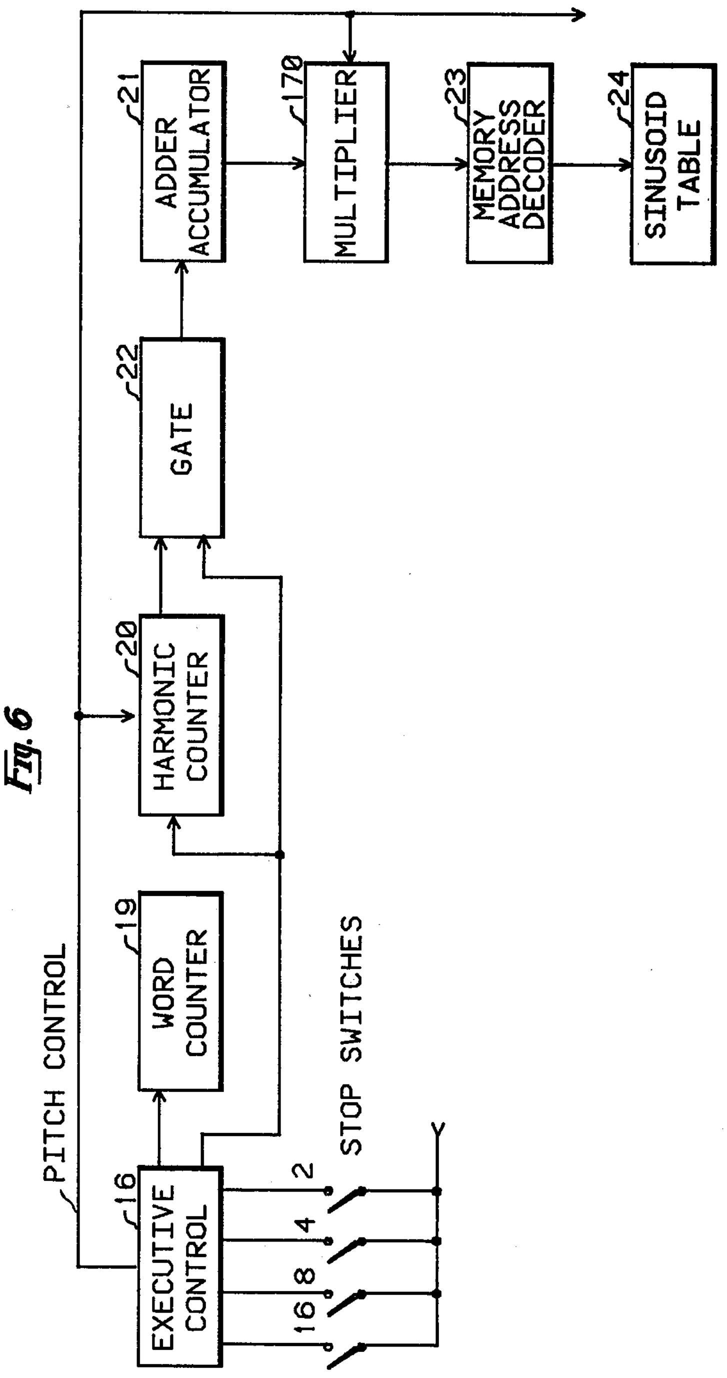
FIG. 6 is a schematic block diagram for an alternate embodiment of the present invention.

FIG. 6 illustrates an alternate embodiment of the present invention for producing unified tones at octave and mutation pitches. The 16, 8, and 4-foot pitches are referred to as the octave pitches. The computation cycle is divided into a number of segments corresponding to the total number of unified pitches that are generated by the system.

Notice that the binary right shift 101 of the system shown in FIG. 1 has been replaced by multiplier 170 in the system shown in FIG. 6. The multiplier 170 is implemented to multiply data read out of the adder accumulator by a constant scale factor before the data is transferred to the memory address decoder 23. Table 1 shows the scale factors used for the various segments of the computation cycle.

TABLE 1

| Pitch footage | Scale factor |
|---|---|
| 16 | ¼ |
| 8 | ½ |
| 4 | 1 |
| 2 | 2 |
| 1 | 4 |
| 2⅔ | 3/2 |
| 1 3/5 | 5/2 |

The set of preselected scale factors can be stored in a memory within multiplier 170 and values can be selected in response to the state of the PITCH CONTROL signal.

The component master data sets for all except the 16-foot pitch are combined with that for the 8 and 4 foot pitches in the manner previously described for the embodiment of the invention illustrated in FIG. 1. The 16-foot master data set and the data read out cycle are treated the same as that previously described in connection with FIG. 1.

An advantage of obtaining the set of mutation pitches in the inventive manner is that only a single set of harmonic coefficients is jointly shared by all the pitches and harmonic suppression logic or special harmonic coefficient data sets are not required. The tonal result is imitative of that produced by unified organs.

The sinsusoid table 24 shown in FIG. 1 can be replaced by a table of orthogonal functions as described in the referenced U.S. Pat. No. 4,085,644. Odd symmetric orthogonal functions can be used instead of the sine functions and even symmetric orthogonal functions can be used instead of cosine functions.

I claim:

1. In a musical instrument in which successive points of a musical waveshape are computed by means of a discrete Fourier transform using a set of harmonic coefficients stored in numerical order corresponding to the harmonic number of the Fourier transform to form a master data set, apparatus for simultaneously producing a plurality of unified tones at pitches responsive to the setting of a plurality of stop switches comprising;

a means for computing a plurality of master data sets during each of a plurality of computation cycle segments of a sequence of computation cycles wherein a first master data set is computed using the complete stored set of said harmonic coefficients, wherein a second master data set having odd symmetry is computed using the even numbered harmonic coefficients selected from said set of harmonic coefficients, and wherein a third master data set having even symmetry is computed using the odd numbered harmonic coefficients selected from said set of harmonic coefficients, a first memory means comprising a plurality of master memory means for storing said plurality of master data sets, a second memory means comprising a plurality of note memory means for storing input data to be thereafter read out, data transfer means for addressing master data sets out from said plurality of master memory means and for storing said addressed master data sets in said plurality of note memory means in said second memory means, a means for producing musical waveshapes from master data sets read out of said plurality of note memory means, a variable frequency clock generator, and data reconstruction means responsive to said variable frequency clock generator whereby master data sets are read out of said plurality of note memory means in said second memory means and are combined to form a combined data set using combination circuitry responsive to the even symmetry of said third master data set and the odd symmetry of said second master data set and whereby the combined data set is furnished to said means for producing musical waveshapes thereby creating said plurality of unified tones.

2. A musical instrument according to claim 1 wherein said means for computing comprises;

a word counter means incremented at each computation time in said computation cycle wherein said word counter means counts modulo a specified set number, a harmonic counter means incremented each time said word counter means returns to its initial state wherein said harmonic counter means counts modulo a specified maximum harmonic number, and an adder-accumulator means, operative at each successive time in each of said plurality of computation cycle segments and reset to an initial state at the start of each computation cycle segment, for adding contents of said harmonic counter means to the sum contained in said adder-accumulator.

3. A musical instrument according to claim 2 wherein said means for computing further comprises;

stop logic circuitry for generating a pitch control signal responsive to the setting of said plurality of stop switches, multiplier means responsive to said pitch control signal for multiplying contents of said adder-accumulator means by a member of a set of preselected constants selected by said pitch control signal thereby generating scaled argument values, a table of orthogonal functions, and a first table addressing means for accessing orthogonal function values from said table of orthogonal functions corresponding to said generated scaled argument values to be used in computing said discrete Fourier transform.

4. A musical instrument according to claim 3 wherein said means for computing further comprises;

a memory means containing a set of constant data values, computation cycle circuitry responsive to setting of said plurality of stop switches for generating timing functions for said plurality of computation cycle segments, and a memory addressing means responsive to said pitch control signal whereby a selected constant is accessed from said scale memory means for each member of said plurality of computation cycle segments.

5. A musical instrument according to claim 4 wherein said means for computing further comprises;

a first coefficient memory storing a set of harmonic coefficients each specifying the relative amplitude of even constituent harmonic components of said master data sets corresponding to an even valued content of said harmonic counter, a second coefficient memory storing a set of harmonic coefficients each specifying the relative amplitude of odd constituent harmonic components of said master data sets corresponding to an odd valued content of said harmonic counter, an evaluating means, operative during each of said plurality of said computation cycles, for separately generating each of said even constituent harmonic components by multiplying the harmonic coefficient value for that harmonic component, accessed from said first coefficient memory, by an orthogonal function value accessed from said table of orthogonal functions, and for separately generating each of said odd constituent harmonic components of said odd constituent harmonic components by multiplying the harmonic coefficient for that harmonic component, accessed from said second coefficient memory, by an orthogonal function value accessed from said table of orthogonal functions, means for accumulating said generated even and odd constituent harmonic components to form said master data sets, and master data select means whereby master data sets formed by said means for accumulating are stored in said first memory means.

6. A musical instrument according to claim 5 wherein said first memory means further comprises;

a main memory means, an even memory means, an odd memory means, and a data select means responsive to said pitch control signal whereby the master data sets computed during computation cycle segments for which said selected constant has a numerical value not less than the number ½ are stored in said main memory means, whereby the master data sets computed from said even constituent harmonic components during computation cycle segments for which said selected constant has a numerical value less than the number ½ are stored in said even memory means, and whereby master data sets formed from said odd constituent harmonic components during computation cycle segments for which said selected constant has a numerical value less than the number ½ are stored in said odd memory means.

7. A musical instrument according to claim 6 wherein said second memory means further comprises;

a main note memory means, an even note memory means, an odd note memory means, and data transfer means for addressing data out from said first memory means further comprising transfer select circuitry whereby the master data set read out of said main memory means is stored in said main note memory means, whereby the master data set read out of said even memory means is stored in said even note memory means, and whereby the master data set read out of said odd memory means is stored in said odd note memory means.

8. A musical instrument according to claim 7 wherein said table of orthogonal functions comprises a set of orthogonal functions stored in memory at memory addresses having succesive integer values and wherein the orthogonal functions have odd symmetry numerical values for memory addresses symmetrical about the middle value of the numerical range of said succesive integer values.

9. A musical instrument according to claim 8 wherein said data reconstruction means further comprises;

a first complementary means interposed between the output of said main note memory means and input to said means for producing musical waveshapes, and a main note register addressing means responsive to the binary states of a first register control signal for addressing said main note memory means in a first direction providing accessed master data set data in a first order to said means for producing musical waveshapes when said first register control signal is in a first binary state and for addressing said main note memory means in a second direction providing accessed master data set data to said first complementing means in an order opposite to said first order when said first register signal is in a second binary state.

10. A musical instrument according to claim 9 wherein said main note register addressing means further comprises;

an up/down counter incremented by said variable frequency clock generator whereby the contents of said up/down counter are used to address values in said main note memory, and a control signal generator for creating the binary states of said first register control signal wherein the first register control signal is created with a first binary state signal when said up/down counter is in its increasing count mode and for creating said first register control signal with a second binary state signal when said up/down counter is in its decreasing count mode.

11. A musical instrument according to claim 7 wherein said table of orthogonal functions comprises a set of orthogonal functions stored in memory at memory addresses having succesive integer values and wherein the orthogonal functions have even symmetry numerical values for memory addresses symmetrical about the middle value of the numerical range of said succesive integer values.

12. A musical instrument according to claim 11 wherein said data reconstruction means further comprises;

a main note register addressing means responsive to the binary states of a second register control signal for addressing said main note memory means in a first direction providing accessed master data set data in a first order to said means for producing musical waveshapes when said second register control signal is in a first binary state and for addressing said main note memory means in a second direction providing accessed master data set data in an order opposite to said first order to said means for producing musical waveshapes when said second register signal is in a second binary state.

13. A musical instrument according to claim 12 wherein said main note register addressing means further comprises;

an up/down counter incremented by said variable frequency clock generator whereby the contents of said up/down counter are used to address values in said main note memory, and a control signal generator for creating the binary states of said second register control signal wherein the second register control signal is created with a first binary state signal when said up/down counter is in its increasing count mode and for creating said second register control signal with a second binary state signal when said up/down counter is in its decreasing count mode.

14. A musical instrument according to claim 10 wherein said data reconstruction means further comprises;

a first algebraic sign means wherein data read out of said odd note memory means in response to the state of said up/down counter is changed in algebraic sign in response to said first binary state signal, a second algebraic sign means wherein data read out of said even note memory means in response to the state of said up/down counter is changed in algebraic sign in response to said first binary state signal, and an adder means wherein data provided from said first and second algebraic sign means are summed and furnished to said means for producing musical waveshapes.

15. A musical instrument according to claim 14 further comprising;

a first control circuitry for generating a first sign signal when said binary state signal changes from said second binary state to said first binary state, a second control circuitry for generating a second sign signal when said binary state signal changes from said first binary state to said second binary state, a first control means responsive to said first sign signal for causing said first algebraic sign means to change the algebraic sign of data read out of said odd note memory means, and a second control means responsive to said second sign signal for causing said second algebraic sign means to change the algebraic sign of data read out of said even note memory means.

16. A musical instrument according to claim 7 wherein said data reconstruction means further comprises;

a first algebraic sign means wherein data read out of said even note register in response to state of said up/down counter is changed in algebraic sign in response to said first binary state signal, a second algebraic sign means wherein data read out of said odd note memory means in response to sate of said up/down counter is changed in algebraic sign in response to said first binary state signal, and an adder means wherein data provided from said first and second algebraic sign means are summed and furnished to said means for producing musical waveshapes.

17. A musical instrument according to claim 16 further comprising;

a first control circuitry for generating a first sign signal when said binary state signal changes from said second binary state to said first binary state, a second control circuitry for generating a second sign signal when said binary state signal changes from said first binary state to said second binary state, a first control means responsive to said first sign signal for causing said first algebraic sign means to change the algebraic sign of data read out of said even note memory means, and a second control means responsive to said second sign signal for causing said second algebraic sign means to change the algebraic sign of data read out of said odd note memory means.

18. In a musical instrument having one or more tone generators in which successive points of a musical waveshape are computed by means of a discrete Fourier transform, apparatus for producing unified tones at selectable pitches comprising;

a keyboard comprising a plurality of key switches, a plurality of stop switches for selecting the pitches of said unified tones, digital computing means responsive to the setting of said stop switches for generating a main master data set, an even main master data set and an odd main master data set, a plurality of memory means wherein each memory means comprises three data registers, transfer means responsive to the actuation of said key switches wherein said main master data set, said even master data set and said odd master data set are transferred from said digital computing means for selected members of said plurality of memory means, a plurality of variable frequency clock generators each associated with a member of said plurality of memory means whereby associated registers are addressed at a selected clock rate, means responsive to the actuation of any member of said plurality or key switches for setting the frequencies of said clock generators to predetermined values assigned to said key switches, digital-to-analog converter means coupled to said plurality of registers, and means for addressing data from said plurality of registers whereby addressed data is combined and furnished to said digital-to-analog converter means thereby generating said unified tones at different pitches.

* * * * *